(12) United States Patent
Hwang et al.

(10) Patent No.: US 8,625,043 B2
(45) Date of Patent: Jan. 7, 2014

(54) DISPLAY DEVICE

(75) Inventors: Jeong-Ho Hwang, Yongin (KR);
Hwan-Jin Kim, Yongin (KR);
Sang-Min Yi, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 198 days.

(21) Appl. No.: 13/175,268

(22) Filed: Jul. 1, 2011

(65) Prior Publication Data

US 2012/0182493 A1 Jul. 19, 2012

(30) Foreign Application Priority Data

Jan. 19, 2011 (KR) ........................ 10-2011-0005378

(51) Int. Cl.
*G02F 1/1333* (2006.01)

(52) U.S. Cl.
USPC .................................. 349/58; 349/56; 349/60

(58) Field of Classification Search
USPC ................................. 349/56, 58, 60
See application file for complete search history.

(56) References Cited

U.S. PATENT DOCUMENTS 7,738,051 B2 * 6/2010 Lee et al. ........................ 349/58
2011/0187634 A1 * 8/2011 Kim et al. ..................... 345/102

FOREIGN PATENT DOCUMENTS

| EP | 2 071 393 A1 | 6/2009 |
|---|---|---|
| KR | 10-0722097 (B1) | 5/2007 |
| KR | 10-2008-0056867 (A) | 6/2008 |
| KR | 10-0876236 (B1) | 12/2008 |
| KR | 10-2009-0120355 (A) | 11/2009 |

* cited by examiner

*Primary Examiner* — Jennifer Doan
(74) *Attorney, Agent, or Firm* — Knobbe Martens Olson & Bear LLP

(57) ABSTRACT

A display device is disclosed. In one embodiment, the display device includes a display panel displaying an image and a bottom chassis including a bottom portion where the display panel is mounted and a plurality of side walls connected with the bottom portion and facing a side surface of the display panel. At least two of the side walls include a base side wall and a reinforcing side wall integrally formed with the base side wall by a connection portion. The connection portion and the reinforcing side wall are bent from the base side wall and thus partially overlap the base side wall.

14 Claims, 10 Drawing Sheets

DISPLAY DEVICE

RELATED APPLICATIONS

This application claims priority to and the benefit of Korean Patent Application No. 10-2011-0005378 filed in the Korean Intellectual Property Office on Jan. 19, 2011, the entire contents of which are incorporated herein by reference.

BACKGROUND

1. Field

The described technology generally relates to a display device. More particularly, the described technology relates generally to a display device of which a receiving module protecting a display panel has improved mechanical strength.

2. Description of the Related Technology

A liquid crystal display (LCD) and an organic light emitting diode (OLED) display are thin, light-weight, and consume less power so that they have been applied to mobile electronic devices, such as smart phones, and also large-sized, fixed placement displays for home use.

LCD and OLED displays include display panels and receiving modules that receive and support the display panel. Unlike an OLED display, an LCD further includes a backlight unit providing light to the display panel. The receiving module includes a bottom chassis (or bezel) formed of a bottom portion and four side walls to cover rear and side surfaces of the display panel for protection.

SUMMARY

One inventive aspect is a display device that can enhance the mechanical strength of a bottom chassis without increasing the height of a side wall or the thickness of a bottom portion and the thickness of the side wall.

Another aspect is a display device which includes: a display panel displaying an image, and a bottom chassis including a bottom portion where the display panel is mounted and a plurality of side walls connected with the bottom portion and facing a side surface of the display panel. At least two side walls of the plurality of side walls respectively include base side walls and reinforcing side walls integrally formed with the base side walls by connection portions. The connection portion and the reinforcing side wall are folded from the base side wall and thus partially overlap the base side wall.

The height of the reinforcing side wall may be smaller than that of the base side wall, and the connection portion may be formed at both ends of the reinforcing side wall. The connection portion and the reinforcing side wall may be folded to the inside of the base side wall such that the connection portion overlaps both ends of the base side wall, and the reinforcing side wall may overlap a lower portion of the base side wall toward the bottom portion.

The display device may further include a mold frame assembled with the bottom chassis at an inner side of the bottom chassis and formed in the shape of a rectangular frame.

The mold frame may be disposed in parallel with the reinforcing side wall, and the height of the mold frame may be equal to or greater than the height of the reinforcing side wall and less than the height of the base side wall.

The display device may further include a backlight unit disposed in an inner space of the mold frame. The display panel may be a liquid crystal display panel, and may be disposed in parallel with the base side wall on the mold frame and the backlight unit.

The display device may further include a buffering member disposed in an inner space of the mold frame. The display panel may be an organic light emitting diode display panel, and may be disposed in parallel with the base side wall on the mold frame and the buffering member.

The mold frame and the base side wall may have the same height, and may contact the reinforcing side wall and separated from the base side wall. The mold frame and the base side wall may have the same height, and the mold frame may form a protrusion portion toward the base side wall and thus may contact the reinforcing side wall and the base side wall.

The display device may further include a backlight unit disposed in the inner space of the mold frame. The display panel may be a liquid crystal display panel, and may be disposed on the backlight unit in the inner space of the mold frame.

The display device may further include a buffering member disposed in the inner space of the mold frame. The display panel may be an organic light emitting diode display panel, and may be disposed on the buffering member in the inner space of the mold frame.

The display panel includes a flexible circuit board fixed to one side end, and the flexible circuit board may be bent backward at the bottom chassis while surrounding one side wall among the plurality of side walls. The connection portion and the reinforcing side wall may be provided in at least two side walls among the plurality of side walls, excluding the side wall surrounded by the flexible circuit board.

DETAILED DESCRIPTION

As mobile electronic devices and home display electronics become thinner, the thickness of a display panel and the height of a side wall of a bottom chassis also decrease. However, in this case, the strength of the bottom chassis is weakened so that the chassis may bend when external impact is applied thereto. Accordingly, the display panel or the backlight unit placed in the bottom chassis may be damaged.

In order to enhance the mechanical strength of the bottom chassis, the height of the side wall or the thickness of the bottom portion and the thickness of the side wall need to be increased. However, such an increase is incompatible with the goal of a thin profile of the display device, and therefore a method for enhancing the mechanical strength of the bottom chassis without increasing the height of the side wall or the thickness of the bottom portion and the thickness of the side wall is desirable.

Embodiments will be described more fully hereinafter with reference to the accompanying drawings. As those skilled in the art would realize, the described embodiments may be modified in various different ways.

Figure 1:
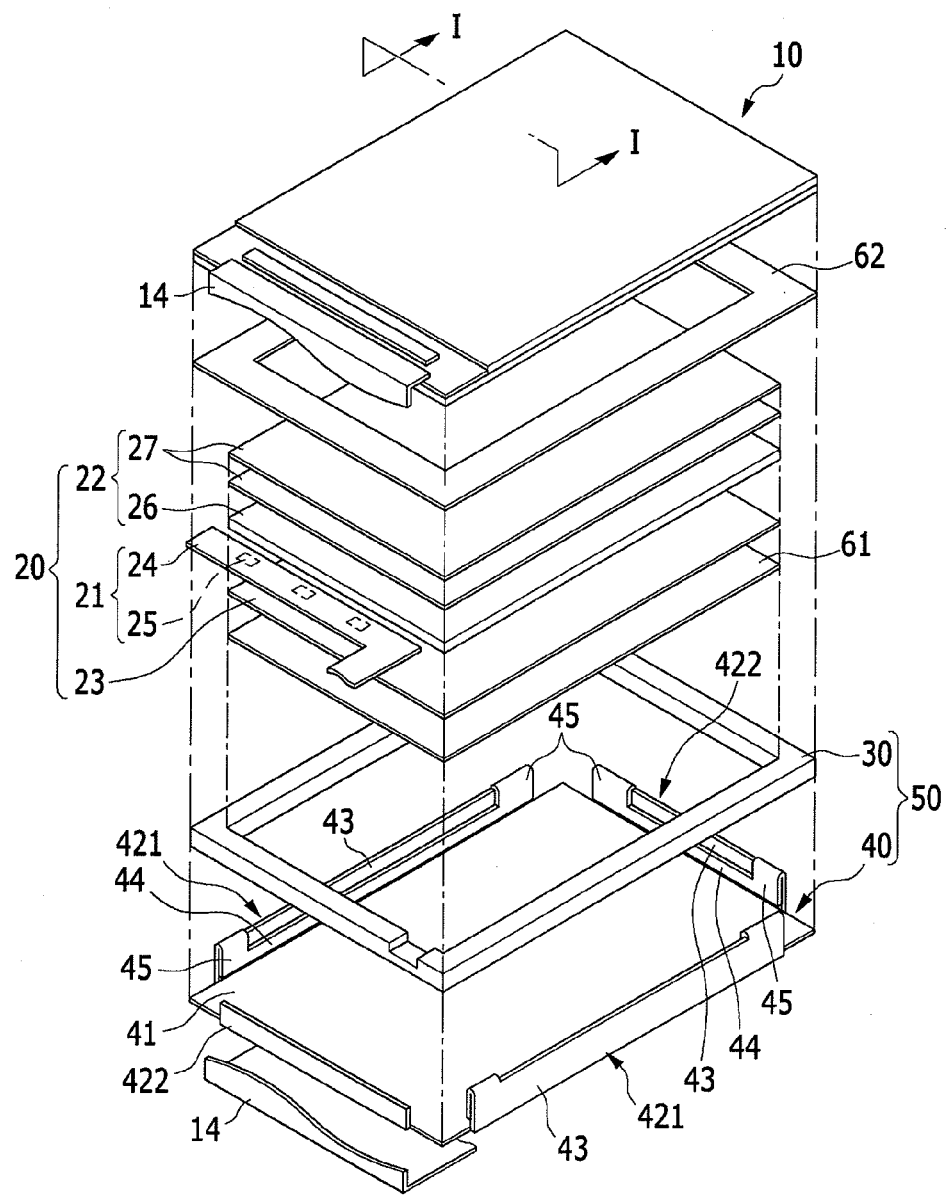
FIG. 1 is an exploded perspective view of a display device according to a first embodiment.
Figure 2:
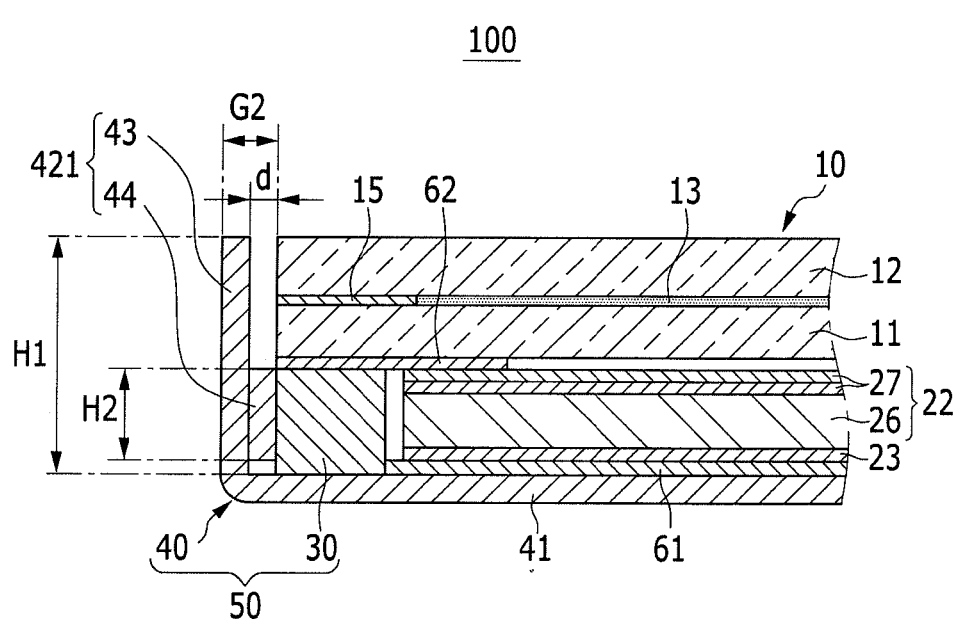
FIG. 2 is a cross-sectional view showing an assembled state of the display device of FIG. 1, taken along the line I-I.

FIG. 1 is an exploded perspective view of a display device according to a first embodiment, and FIG. 2 is a cross-sectional view showing an assembled state of the display of FIG. 1, taken along the line I-I. The display device of the first embodiment is formed as a liquid crystal display (LCD).

Referring to FIG. 1 and FIG. 2, a display device 100 includes a liquid crystal display panel 10, a backlight unit 20, a mold frame 30, and a bottom chassis 40. The backlight unit 20 provides light to the liquid crystal display panel 10, and the liquid crystal display panel 10 displays an image by controlling a light transmission amount for each pixel. The mold frame 30 and the bottom chassis 40 form a receiving module 50, and receive and support the liquid crystal display panel 10 and the backlight unit 20.

The liquid crystal display panel 10 includes a thin film transistor substrate 11, a color filter substrate 12, and a liquid crystal layer 13 (refer to FIG. 2) injected between the two substrates 11 and 12. In one embodiment, a polarizing plate (not shown) is disposed at an outer side of the thin film transistor substrate 11 and the color filter substrate 12, and a flexible circuit board 14 is fixed to one end of the thin film transistor substrate 11.

Referring to FIG. 1, a flexible circuit board 14 is bent to the rear side of the bottom chassis 40 and connected with a panel driver (not shown) formed of a printed circuit board where a driving circuit is mounted. Thus, the flexible circuit board 14 transmits a video signal and a driving voltage generated from the panel driver to the thin film transistor substrate 11. All types of disclosed liquid display panels may be used as the liquid crystal display panel 10.

The backlight unit 20 includes a light source unit 21, a light guide unit 22, and a reflection film 23, and is disposed at a lower portion of the liquid crystal display panel 10. The light source unit 21 is formed of a printed circuit film 24 and at least one light emitting diode 25 mounted on the printed circuit film 24. The light source unit 21 may include a cold cathode fluorescent lamp (CCFL), that is, a linear light source, instead of the light emitting diode 25, that is, a dot light source.

The light guide unit 22 includes a light guiding plate 26 and at least one optical sheet 27. The light guiding plate 26 is disposed at one side of the light source unit 21, and receives light emitted from the light source unit 21 and substantially uniformly transmits the light to the liquid crystal display panel 10.

The optical sheet 27 is disposed between the light guiding plate 26 and the liquid crystal display panel 10. The optical sheet 27 may include a diffusion sheet and a prism sheet. The diffusion sheet diffuses light supplied from the light guiding plate 26 and enhances straightness of the light diffused by the diffusion sheet. The reflection film 23 is disposed at a lower portion of the light guiding plate 26, and reflects light provided from the light guiding plate 26 upward.

The mold frame 30 is formed in the shape of a rectangle having an opening at a center thereof, and the backlight unit 20 is disposed in the mold frame 30. Thus, the mold frame 30 supports the backlight unit 20 by surrounding sides thereof. The mold frame 30 may be manufactured through injection molding using a polymer resin such as a plastic.

The bottom chassis 40 includes a bottom portion 41 where the liquid crystal display panel 10, the backlight unit 20, and the mold frame 30 are placed, and a plurality of side walls 421 and 422 protruding toward the liquid crystal display panel 10 from edges of the bottom portion 41. The side walls 421 and 422 of the bottom chassis 40 face the outer side of the mold frame 30 and a side of the liquid crystal display panel 10. The bottom chassis 40 may be formed through a hemming process so that it may be formed by folding a metal plate having a constant thickness several times.

In one embodiment, the mold frame 30 has a rectangular frame shape without having a bottom portion thereof, so that the backlight unit 20 is disposed on the bottom portion 41 of the bottom chassis 40. In this case, the thickness of the LCD 100 can be reduced, thereby manufacturing a thinner LCD.

A buffering sheet 61 may be disposed between the backlight unit 20 and the bottom portion 41 in order to absorb an external impact. The height of the mold frame 30 may be substantially equal to the sum of the thickness of the backlight unit 20 and the thickness of the buffering sheet 61. The liquid crystal display panel 10 is fixed onto the mold frame 30 and the backlight unit 20 by an adhesive sheet 62.

The liquid crystal display panel 10 may be formed in the shape of a rectangle having a pair of long sides and a pair of short sides. The mold frame 30 and the bottom portion 41 of the bottom chassis 40 may respectively be formed in the shape of a rectangle corresponding to the shape of the liquid crystal display panel 10. In this case, the bottom chassis 40 includes a pair of first side walls 421 and a pair of second side walls 422. The first side walls 421 and the second side walls 422 respectively cross each other substantially perpendicularly, and the length of the first side walls 421 is greater than that of the second side walls 422.

At least two side walls among the four side walls 421 and 422 of the bottom chassis 40 are formed of a base side wall 43 and a reinforcing side wall 44 having a height that is lower than the base side wall 43 and partially overlapping with the base side wall 43 toward the bottom portion 41. In FIG. 2, the height of the base side wall 43 is denoted as H1 and the height of the reinforcing side wall 44 is denoted as H2.

In the following description, the reinforcing side wall 44 overlaps a lower portion of the base side wall 43 in the drawing for convenience of description. The base side wall 43 is formed in a substantially rectangular shape so as to face an outer surface of the mold frame 30 and a side surface of the liquid crystal display panel 10. The reinforcing side wall 44 overlaps with a lower portion of the base side wall 43 such that a lower portion of the corresponding side wall is double-structured.

The flexible circuit board 14 is bent backward at the bottom chassis 40 while surrounding one of the four side walls 421 and 422 of the bottom chassis 40 at an outer side of the side wall. At least two side walls including the reinforcing side wall 44 imply at least two side walls among three side walls. That is, among the four side walls, a side wall surrounded by the flexible circuit board 14 is excluded.

FIG. 1 illustrates that the flexible circuit board 14 is bent backward at the bottom chassis 40 while surrounding the second side wall 422. In this case, the first side walls 421 or the second side wall 422 different from the first side walls 421 include the reinforcing side wall 44. FIG. 1 illustrates that a second side wall 422 that is different from the first side walls 421 includes the reinforcing side wall 44.

Figure 3:
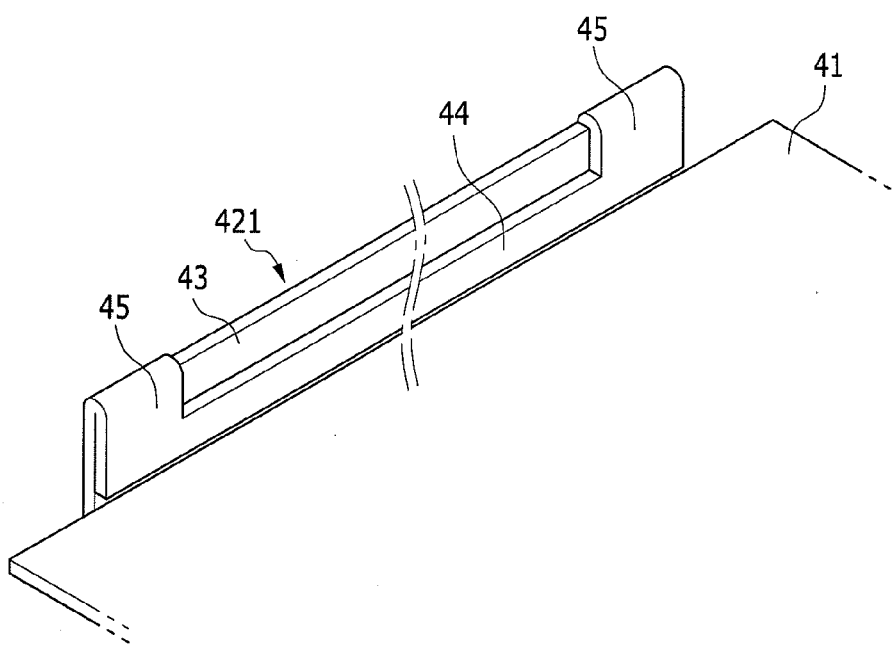
FIG. 3 is an enlarged perspective view of a first side wall of a bottom chassis of FIG. 1.

FIG. 3 is an enlarged perspective view of the first side wall of the bottom chassis in FIG. 1.

Referring to FIG. 2 and FIG. 3, the base side wall 43 is single-layered and formed in a substantially rectangular shape. The height of the base side wall 43 may be substantially the same as the sum of the thickness of the mold frame 30, the thickness of the adhesive sheet 62, and the thickness of the liquid crystal display panel 10. The base side wall 43 may be disposed at the center of the edge at a predetermined distance from the corner portion of the bottom portion 41.

The reinforcing side wall 44 is integrally formed with the base side wall 43 by a pair of connection portions 45. The connection portions 45 are disposed at both ends of the reinforcing side wall 44. The connection portions 45 and the reinforcing side wall 44 are bent inwardly at the base side wall 43 such that they overlap with the base side wall 43.

Figure 4:
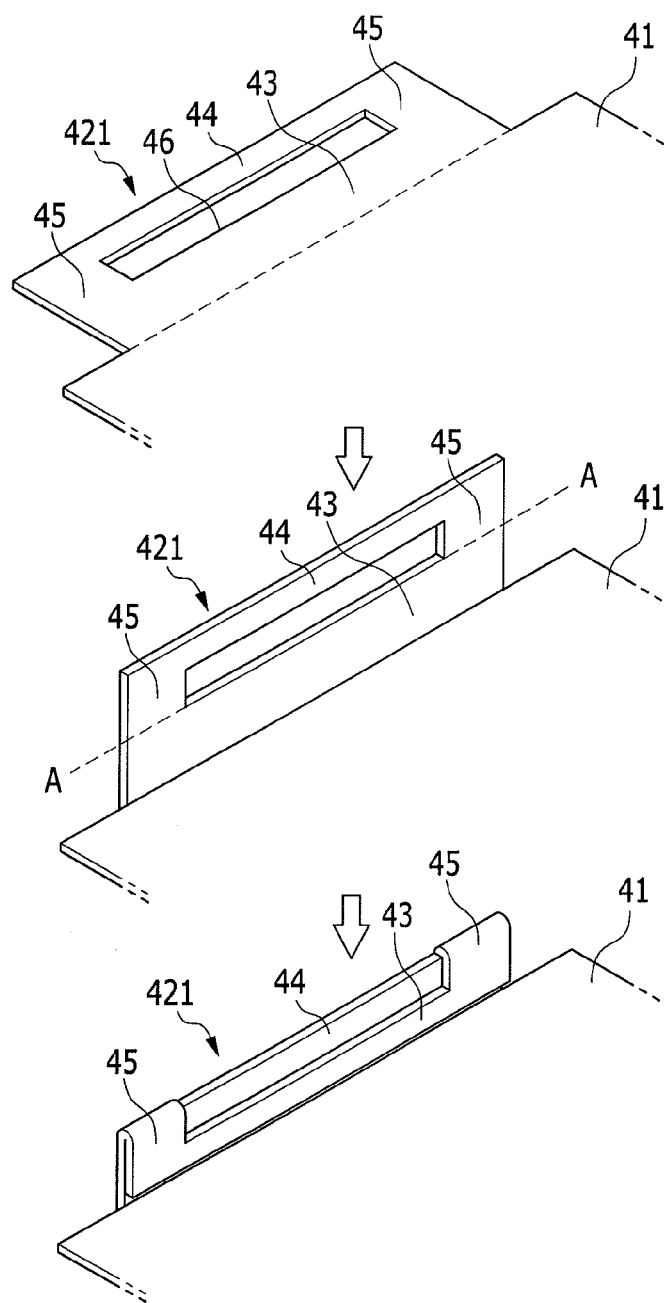
FIG. 4 is a flowchart of a process for forming the first side wall of FIG. 3.

FIG. 4 is a flowchart showing a forming process of the first side wall of FIG. 3.

Referring to FIG. 4, the first side wall 421 of the bottom chassis 40 includes the base side wall 43 connected with the bottom portion 41, the connection portions 45, and the reinforcing side wall 44. The connection portions 45 and the reinforcing side wall 44 are disposed at an outer side of the base side wall 43. An opening 46 surrounded by the base side wall 43, the connection portions 45, and the reinforcing side wall 44 is formed in the first side wall 421. The first side wall 421 is disposed in substantially parallel with the bottom portion 41.

The first side wall 421 is bent about 90 degrees from the bottom portion 41, and end portions of the connection portions 45 are bent inwardly from the base side wall 42 such that the connection portions 45 and the reinforcing side wall 44 overlap with both ends and the lower portion of the side wall 43. In FIG. 4, the line A-A denotes a reference line for bending of the connection portions 45.

Before bending the base side wall 43 from the bottom portion 41, the end portions of the connection portions 45 may be bent to make the connection portions 45 and the reinforcing side wall 44 overlap with the base side wall 43, and then the base side wall 43 may be bent about 90 degrees from the bottom portion 41.

As described, the bottom chassis 40 may form the first side wall 421 having the above-stated structure by bending a metal plate having a constant thickness several times. The second side wall 422 is formed in the same shape of the first side wall 421, and is formed through the same process as the forming process of the first side wall 421 shown in FIG. 4.

In the above-stated method, a manufacturing process compared to a process for individually manufacturing the reinforcing side wall 44 and adhering the reinforcing side wall 44 to the base side wall 43 using an adhesive can be simplified, and the reinforcing side wall 44 and the base side wall 43 are integrally formed such that durability of the bottom chassis 40 can be enhanced by preventing detachment or separation of the reinforcing side wall 44.

Referring back to FIG. 2 and FIG. 3, the pair of connection portions 45 and the reinforcing side wall 44 are overlapped with both end portions of the base side wall 43 and the lower portion of the base side wall 43 toward the bottom portion 41 such that both end portions and the lower portion of the corresponding side wall 421 are double-structured. That is, both end portions and the lower portion of the first side wall 421 are double-layered, and the remaining portion of the first side wall 421 is single-layered.

The double-layered end portions and the lower portion of the first side wall 421 enhance mechanical strength of the bottom chassis 40 including the bending strength to protect the liquid crystal display panel 10 from external impact. Such a structure of the first side wall 421 improves the mechanical strength of the bottom chassis 40 while not causing the height of the first side wall 421 or the thickness of the bottom portion 41 and the first side wall 421 to be increased.

The single-layered upper portion of the first side wall 421 enlarges the size of a display window where an image is substantially displayed in the liquid crystal display panel 10. For this, the reinforcing side wall 44 is disposed in substantially parallel with the mold frame 30, and the upper portion of the base side wall 43, not overlapped with the reinforcing side wall 44, is disposed in substantially parallel with the liquid crystal display panel 10.

The height of the mold frame 30 is equal to or greater than the height of the reinforcing side wall 44, and is less than the height of the base side wall 43. FIG. 2 illustrates that the upper surface of the mold frame 30 is substantially parallel with an upper end portion of the reinforcing side wall 44. Thus, the liquid crystal display panel 10 is disposed in substantially parallel with the single-layered upper portion of the base side wall 43. Such a structure allows enlargement of the display window by disposing the end portion of the liquid crystal display panel 10 further to the outside compared to a comparative example of FIG. 5.

Figure 5:
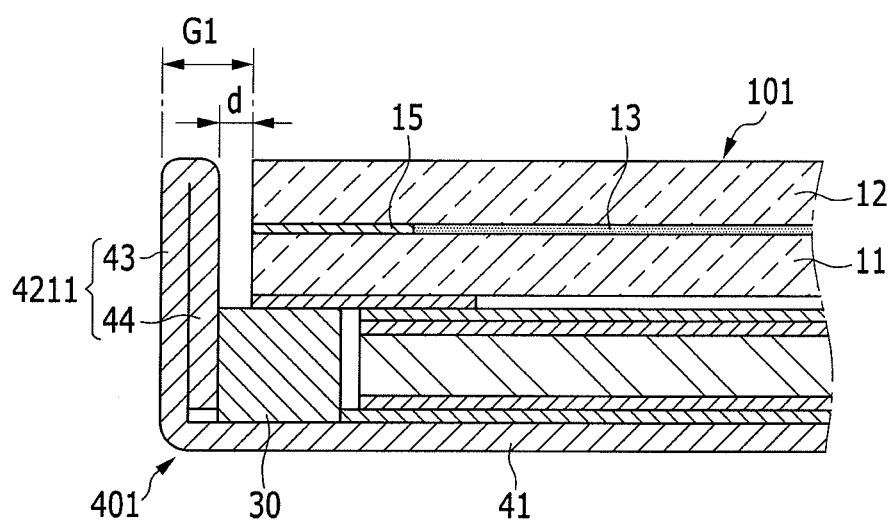
FIG. 5 is a partially enlarged cross-sectional view of a display device according to a comparative example.

FIG. 5 is a partially enlarged cross-sectional view of a display device according to a comparative example that shows that a reinforcing side wall is formed by being bent from a base side wall without having a connection portion.

Referring to FIG. 2 and FIG. 5, it is assumed that the liquid crystal display panel 10 of the first embodiment and a liquid crystal display panel 101 of the comparative example respectively include sealing layers 15 that are substantially equivalent to each other in width, and maintain substantially the same distance d from side walls 421 and 4211 of the bottom chassis 40 and 401. In this case, the sealing layer 15 implies a layer that adheres a thin film transistor substrate 11 to a color filter substrate 12 while sealing a liquid crystal layer 13, and the size of a display window is assumed to be substantially the same as that of the liquid crystal layer 13. Further, it is assumed that the bottom chassis 40 of the first embodiment and the bottom chassis 401 of the comparative example have bottom portions 41 that are the same size.

In the structure of the comparative example, an end portion of the liquid crystal display panel 101 maintains a distance G1 with an outer side of the side wall 4211, but in the structure of the first embodiment, an end portion of the liquid crystal display panel 10 maintains a distance G2 with an outer side of the side wall 421. Here, the distance G2 is smaller than the distance G1. Thus, compared to the comparative example, the end portion of the liquid crystal display panel 10 of the first embodiment is disposed further to the outer side so that the size of the display window can be increased.

On the contrary, if the liquid crystal display panel 10 of the first embodiment and the liquid crystal display panel 101 of the comparative example have the same size display window, the width of the outer portion of the display window of the liquid crystal display panel 10 can be reduced compared to the comparative example.

Figure 6:
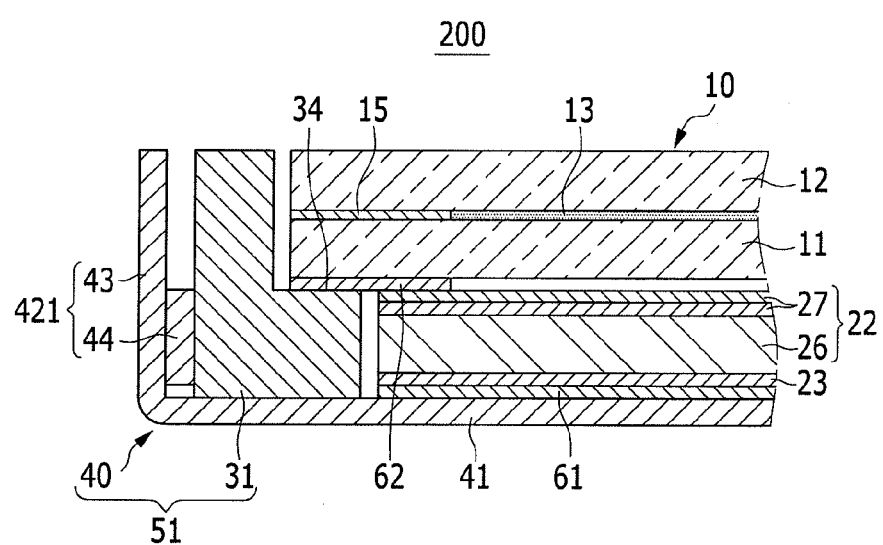
FIG. 6 is a partially enlarged view of a display device according to a second embodiment.

FIG. 6 is a partially enlarged cross-sectional view of a display device according to a second embodiment. In the second embodiment, the display device is formed as a liquid crystal display.

Referring to FIG. 6, a display device 200 according to the second embodiment is the same as the display device of the first embodiment, except that the height of a mold frame 31 is substantially the same as the height of a base side wall 43 of a bottom chassis 40. Like reference numerals designate like elements of the first embodiment.

The mold frame 31 surrounds a side surface of a backlight unit 20 and a side surface of a liquid crystal display panel 10 for support. The mold frame 31 may form an arriving groove 34 for arriving of the liquid crystal display panel 10 thereto.

Compared to the first embodiment, the display device 200 of the second embodiment cannot enlarge the display, window or reduce the width of outer portions of the display window, but the mechanical strength of the bottom chassis 40 can be enhanced using the connection portion 45 (refer to FIG. 3) and the reinforcing side wall 44 and simultaneously the mechanical strength of a receiving module 51 can be further enhanced by increasing the height of the mold frame 31.

An outer surface of the mold frame 31 may be formed substantially perpendicular to the bottom portion 41. In this case, a lower outer side of the mold frame 31 contacts the reinforcing side wall 44, and an upper outer side of the mold frame 31 is distanced from the base side wall 43.

Figure 7:
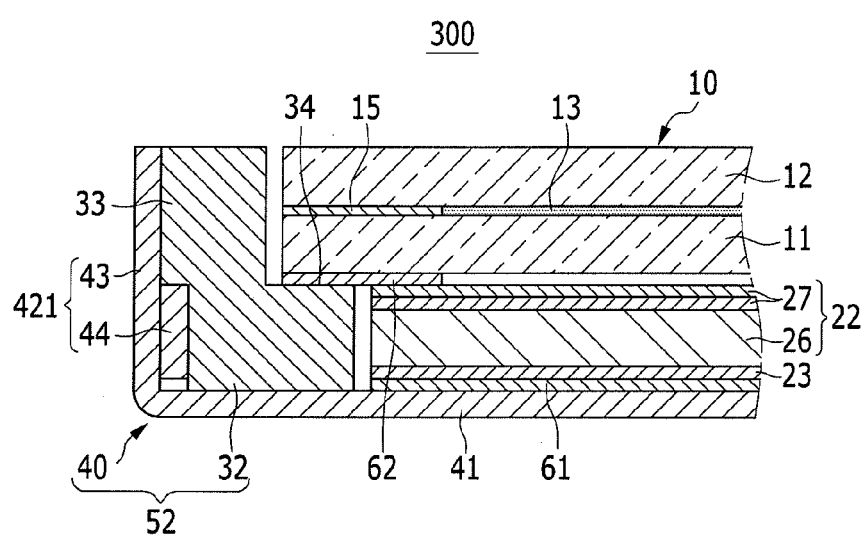
FIG. 7 is a partially enlarged cross-sectional view of a display device according to a third embodiment.

FIG. 7 is a partially enlarged cross-sectional view of a display device according to a third embodiment. The display device of the third embodiment is formed as a liquid crystal display.

Referring to FIG. 7, a display device 300 according to the third embodiment is the same as the display device of the second embodiment, except that a mold frame 32 contacts both a base side wall 43 and a reinforcing side wall 44. Like reference numerals designate like elements of the second embodiment.

The mold frame 32 forms a protrusion portion 33 at an upper outer side, facing the base side wall 43, such that the mold frame 32 contacts both an inner side of the base side wall 43 and an inner side of the reinforcing side wall 44. The display device 300 of the third embodiment can enhance the mechanical strength of a receiving module 52 by increasing bonding force between the mold frame 32 and the bottom chassis 40.

Figure 8:
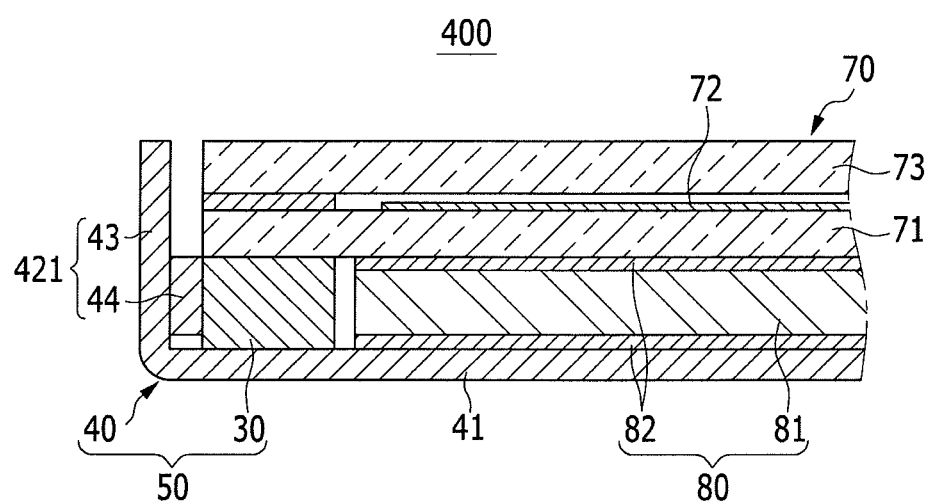
FIG. 8 is a partially enlarged cross-sectional view of a display device according to a fourth embodiment.

FIG. 8 is a partially enlarged cross-sectional view of a display device according to a fourth embodiment. The display device of the fourth embodiment is formed as an organic light emitting diode (OLED) display.

Referring to FIG. 8, a display device 400 of the fourth embodiment is the same as the display device of the first embodiment, except that an OLED display panel 70 is provided instead of a liquid crystal display panel and a buffering member 80 is provided instead of a backlight unit. Like reference numerals designate like elements of the first embodiment.

The OLED display panel 70 includes a substrate 71, a display portion 72 formed on the substrate 71 and including organic light emitting elements and driving circuits, and a sealing member 73 covering the display portion 72. The organic light emitting element includes an anode, an organic emission layer, and a cathode. Holes and electrons are injected to the organic emission layer from the anode and the cathode, and emission of light from the organic emission layer occurs when excitons being combinations of the injected holes and electrodes drop from an excited state to a ground state.

The OLED display panel 70 may be classified as a front emission type or a bottom emission type. In the case of the front emission type, the sealing member 72 is disposed toward an external side of the display device 400, and in the case of the bottom emission type, the substrate 71 is disposed toward an external side of the display device 400. FIG. 8 illustrates a front emission type display panel.

The sealing member 73 may be a glass substrate in the case of the front emission type, or may be a glass substrate or a thin film encapsulation layer in the case of the bottom emission type. The thin film encapsulation layer may be formed of a plurality of layers formed by alternately layering each of a plurality of organic layers and each of a plurality of inorganic layers. Any type of known OLED display panel may be used as the OLED display panel 70.

The buffering member 80 may be formed of a buffering layer 81 having a buffering function and adhesive layers 82 formed at upper and lower surfaces of the buffering layer 81. The buffering layer 81 may be formed with sponge or urethane. The mold frame 30 may be formed to be equal to the buffering member 80 in height and may surround the side surface of the buffering member 80.

Since the display device 400 of the fourth embodiment includes a receiving module 50 that is the same as that of the first embodiment in structure, breakage of the OLED display panel 70 due to external impact can be suppressed by enhancing the mechanical strength of the bottom chassis 40. Further, the display portion 72 of the OLED display panel 70 may be enlarged, or the width of an outer portion of the display portion 72 may be reduced.

Figure 9:
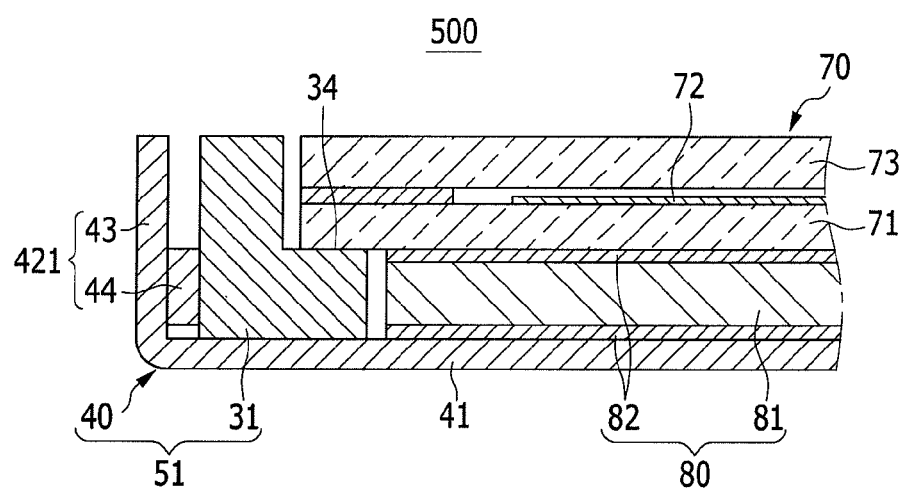
FIG. 9 is a partially enlarged cross-sectional view of a display device according to a fifth embodiment.

FIG. 9 is a partially enlarged cross-sectional view of a display device according to a fifth embodiment. The display device of the fifth embodiment is formed as an OLED display.

Referring to FIG. 9, a display device 500 of the fifth embodiment is similar to the display device of the second embodiment, except that an OLED display panel 70 is provided instead of a liquid crystal display panel and a buffering member 80 is provided instead of a backlight unit. Like reference numerals designate like elements of the second embodiment. The structures and functions of a mold frame 31 and a receiving module 51 are the same as those of the second embodiment, and therefore no further description will be provided.

Figure 10:
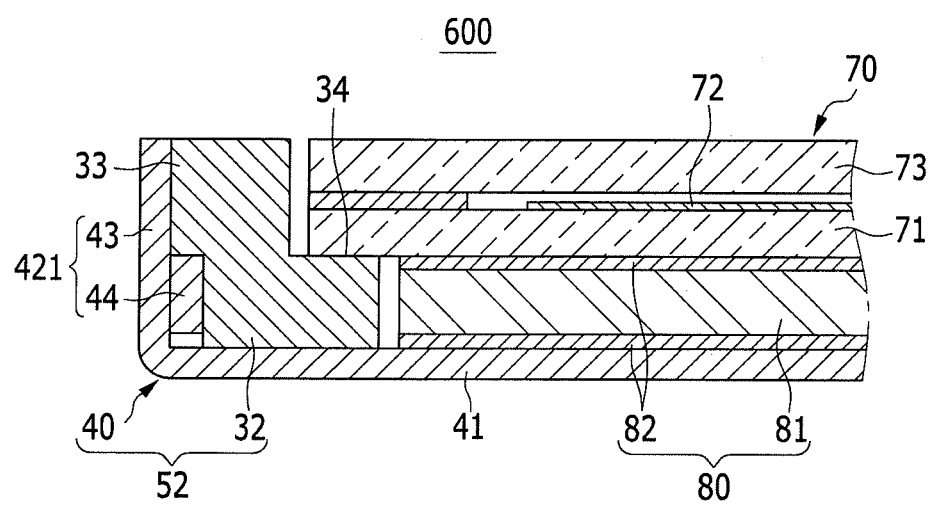
FIG. 10 is a partially enlarged cross-sectional view of a display device according to a sixth embodiment.

FIG. 10 is a partially enlarged cross-sectional view of a display device according to a sixth embodiment. The display device of the sixth embodiment is formed as an OLED display.

Referring to FIG. 10, a display device 600 of the sixth embodiment is similar to the display device of the third embodiment, except that an OLED display panel 70 is provided instead of a liquid crystal display panel and a buffering member 80 is disposed instead of a backlight unit. Like reference numerals designate like elements of the second embodiment. The structures and functions of a mold frame 32 and a receiving module 52 are the same as those of the third embodiment, and therefore no further description will be provided.

In the display devices 400, 500, and 600 of the fourth to sixth embodiments, the entire thickness of each of the buffering member 80 and the OLED display 70 may be smaller than the entire thickness of each of the backlight unit 20 and the liquid crystal display panel 10. Thus, the structure of the receiving modules 50, 51, and 52 of the fourth to sixth embodiments are substantially the same as the receiving modules 50, 51, and 52 of the first to third embodiments, but the height of the mold frames 30, 31, and 32 and the height of the side walls 421 and 422 of the bottom chassis 40 may be smaller compared to the first to third embodiments.

At least one of the disclosed embodiments can stably support a display panel against movement from external impact by enhancing the mechanical strength of the bottom chassis without increasing the height of the side wall of the bottom chassis or the thickness of the bottom portion and the thickness of the side wall. Further, a display window (or display portion) where an image is displayed in the display panel may be enlarged or the width of an outer portion of the display window may be reduced.

While embodiments have been described with reference to the accompanying drawings, it is to be understood that various modifications and equivalent arrangements are included within the spirit and scope of the appended claims.

What is claimed is:

1. A display device comprising:
a display panel configured to display an image; and
a bottom chassis including a bottom portion where the display panel is mounted and a plurality of side wall structures connected with the bottom portion and facing a side surface of the display panel,
wherein one of the plurality of side wall structures includes a base side wall and a reinforcing side wall integrally formed with the base side wall by connection portions, and
wherein the connection portions and the reinforcing side wall are folded from the base side wall and partially overlap with the base side wall,
wherein the side wall structure comprises a recess formed between the connection portions.

2. The display device of claim 1, wherein the height of the reinforcing side wall is smaller than that of the base side wall, and wherein the connection portions are formed at both side ends of the reinforcing side wall.

3. The display device of claim 2, wherein the connection portions and the reinforcing side wall are folded to the inside of the base side wall such that the connection portions at least partially overlaps with both side ends of the base side wall, and wherein the reinforcing side wall at least partially overlaps with a lower portion of the base side wall.

4. The display device of claim 2, further comprising a mold frame assembled with the bottom chassis at an inner side of the bottom chassis and formed in the shape of a substantially rectangular frame.

5. The display device of claim 4, wherein the mold frame is disposed in substantially parallel with the reinforcing side wall, and wherein the height of the mold frame is substantially equal to or greater than the height of the reinforcing side wall and less than the height of the base side wall.

6. The display device of claim 5, further comprising a backlight unit disposed in an inner space of the mold frame, wherein the display panel is a liquid crystal display panel, and is disposed in substantially parallel with the base side wall on the mold frame and the backlight unit.

7. The display device of claim 5, further comprising a buffering member disposed in an inner space of the mold frame,
wherein the display panel is an organic light emitting diode display panel, and is disposed in substantially parallel with the base side wall on the mold frame and the buffering member.

8. The display device of claim 4, wherein the mold frame and the base side wall have substantially the same height, and wherein the mold frame contacts the reinforcing side wall and is separated from the base side wall.

9. The display device of claim 4, wherein the mold frame and the base side wall have substantially the same height, and wherein the mold frame includes a protrusion portion protruding toward the base side wall and located in the recess and contacts the reinforcing side wall and the base side wall.

10. The display device of claim 8, further comprising a backlight unit disposed in the inner space of the mold frame,
wherein the display panel is a liquid crystal display panel and is disposed on the backlight unit in the inner space of the mold frame.

11. The display device of claim 8, further comprising a buffering member disposed in the inner space of the mold frame,
wherein the display panel is an organic light emitting diode display panel, and is disposed on the buffering member in the inner space of the mold frame.

12. The display device of claim 1, wherein the display panel comprises a flexible circuit board fixed to one side end, and wherein the flexible circuit board is bent backward of the bottom chassis while surrounding a selected one of the plurality of side wall structures.

13. A display device comprising:
a display panel configured to display an image; and
a bottom chassis including a bottom portion where the display panel is mounted and a plurality of side walls connected with the bottom portion and facing a side surface of the display panel,
wherein at least two of the side walls respectively include base side walls and reinforcing side walls integrally formed with the base side walls by connection portions, and
wherein the connection portion and the reinforcing side wall are folded from the base side wall and partially overlap with the base side wall,
wherein the display panel comprises a flexible circuit board fixed to one side end, and wherein the flexible circuit board is bent backward of the bottom chassis while surrounding a selected one of the side walls,
wherein the connection portion and the reinforcing side wall are provided in at least two of the side walls, excluding the side wall surrounded by the flexible circuit board.

14. The display device of claim 1, wherein the side wall structure comprises a hole which is surrounded by the connection portions, the base side wall and the reinforcing side wall in a unfolded state and configured to form the recess in the folded state.

* * * * *